United States Patent
Reyes et al.

(10) Patent No.: US 9,334,716 B2
(45) Date of Patent: May 10, 2016

(54) TREATMENT FLUIDS COMPRISING A HYDROXYPYRIDINECARBOXYLIC ACID AND METHODS FOR USE THEREOF

(71) Applicant: Halliburton Energy Services, Inc., Houston, TX (US)

(72) Inventors: Enrique Antonio Reyes, Houston, TX (US); Alyssa Lynn Smith, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 318 days.

(21) Appl. No.: 13/837,090

(22) Filed: Mar. 15, 2013

(65) Prior Publication Data

US 2013/0269941 A1    Oct. 17, 2013

Related U.S. Application Data

(63) Continuation-in-part of application No. 13/444,883, filed on Apr. 12, 2012, now Pat. No. 9,004,168.

(51) Int. Cl.
*E21B 43/16* (2006.01)
*C09K 8/72* (2006.01)
*C09K 8/74* (2006.01)

(52) U.S. Cl.
CPC . *E21B 43/16* (2013.01); *C09K 8/72* (2013.01); *C09K 8/74* (2013.01)

(58) Field of Classification Search
CPC ............. E21B 43/16; C09K 8/74; C09K 8/72
USPC ........................................ 166/305.1, 307, 279
See application file for complete search history.

(56) References Cited

U.S. PATENT DOCUMENTS

| | | |
|---|---|---|
| 104,950 A | 7/1870 | Fuller |
| 139,298 A | 5/1873 | Danforth et al. |
| 142,166 A | 8/1873 | Kromer |
| 182,761 A | 10/1876 | Kelly |
| 209,108 A | 10/1878 | Brokhahne |
| 2,262,428 A * | 11/1941 | Lietz ............................ 507/242 |
| 3,333,634 A | 8/1967 | Townsend et al. |
| 3,684,720 A | 8/1972 | Richardson |
| 3,889,753 A | 6/1975 | Richardson |
| 4,089,787 A | 5/1978 | Lybarger et al. |
| 4,090,563 A | 5/1978 | Lybarger et al. |
| 4,353,805 A | 10/1982 | Kragen et al. |
| 4,428,432 A | 1/1984 | Pabley |
| 4,540,448 A | 9/1985 | Gautier et al. |
| 4,595,512 A | 6/1986 | Tellier et al. |
| 4,708,207 A | 11/1987 | Kalfayan et al. |
| 5,183,122 A | 2/1993 | Rowbotham et al. |
| 5,207,778 A | 5/1993 | Jennings, Jr. |
| 5,259,980 A | 11/1993 | Morris et al. |
| 5,293,942 A | 3/1994 | Gewanter et al. |
| 5,335,733 A | 8/1994 | Sandiford et al. |
| 5,346,010 A | 9/1994 | Adams et al. |
| 5,481,018 A | 1/1996 | Athey et al. |
| 5,529,125 A | 6/1996 | Di Lullo Arias et al. |
| 5,672,279 A | 9/1997 | Sargent et al. |
| 5,783,524 A | 7/1998 | Greindl et al. |
| 5,786,313 A | 7/1998 | Schneider et al. |
| 5,897,699 A | 4/1999 | Chatterji et al. |
| 5,979,557 A | 11/1999 | Card et al. |
| 6,063,738 A | 5/2000 | Chatterji et al. |
| 6,140,277 A | 10/2000 | Tibbles et al. |
| 6,165,947 A | 12/2000 | Chang et al. |
| 6,196,317 B1 * | 3/2001 | Hardy ........................... 166/295 |
| 6,263,967 B1 | 7/2001 | Morris et al. |
| 6,315,045 B1 | 11/2001 | Brezinski |
| 6,436,880 B1 | 8/2002 | Frenier |
| 6,525,011 B2 | 2/2003 | Brezinski |
| 6,531,427 B1 * | 3/2003 | Shuchart et al. ............. 507/267 |
| 6,534,448 B1 | 3/2003 | Brezinski |
| 6,547,871 B2 | 4/2003 | Chatterji et al. |
| 6,549,814 B1 | 4/2003 | Strutz et al. |
| 6,706,668 B2 | 3/2004 | Brezinski |
| 6,746,611 B2 | 6/2004 | Davidson |
| 6,762,154 B2 | 7/2004 | Lungwitz et al. |

(Continued)

FOREIGN PATENT DOCUMENTS

| | | |
|---|---|---|
| EP | 0073599 A1 | 3/1983 |
| EP | 0976911 A1 | 2/2000 |
| EP | 1004571 A1 | 5/2000 |
| EP | 1188772 A2 | 3/2002 |
| EP | 1520085 A1 | 4/2005 |
| EP | 1817391 A2 | 8/2007 |
| EP | 2371923 A1 | 10/2011 |
| WO | 9640625 A1 | 12/1996 |
| WO | 00/04868 A2 | 2/2000 |
| WO | 0142387 A1 | 6/2001 |

(Continued)

OTHER PUBLICATIONS

STD 1092, Methyl glycine diacetic acid trisodium salt, 2004.
Technical Information Paper XP-002457846.
Removal of Filter Cake Generated by Manganese Tetraoxide Water-Based Drilling Fluids, Abdullah Mohammed A. Al Mojil, Texas A&M, Aug. 2010.
Removing of Formation Damage and Enhancement of Formation Productivity Using Environmentally Friendly Chemicals, Mohammed Ahmed Nasr Eldin Mahmoud, Texas A&M, May 2011.

(Continued)

*Primary Examiner* — Doug Hutton, Jr.
*Assistant Examiner* — Silvana Runyan
(74) *Attorney, Agent, or Firm* — McDermott Will & Emery LLP; Holly Soehnge

(57) ABSTRACT

Treatment fluids can mitigate the occurrence or effects of precipitation in a subterranean formation through complexation of a metal ion therein. Methods for treating a subterranean formation can comprise: providing a treatment fluid comprising a hydroxypyridinecarboxylic acid, a salt thereof, or a tautomer thereof; introducing the treatment fluid into a subterranean formation; and complexing a metal ion in the subterranean formation with the hydroxypyridinecarboxylic acid.

17 Claims, No Drawings

(56) References Cited

U.S. PATENT DOCUMENTS

| | | |
|---|---|---|
| 6,806,236 B2 | 10/2004 | Frenier et al. |
| 6,828,280 B2 | 12/2004 | England et al. |
| 6,881,709 B2 | 4/2005 | Nelson et al. |
| 6,903,054 B2 | 6/2005 | Fu et al. |
| 6,924,253 B2 | 8/2005 | Palmer et al. |
| 6,929,070 B2 | 8/2005 | Fu et al. |
| 6,978,838 B2 | 12/2005 | Parlar et al. |
| 6,987,083 B2 | 1/2006 | Phillippi et al. |
| 7,028,775 B2 | 4/2006 | Fu et al. |
| 7,036,585 B2 | 5/2006 | Zhou et al. |
| 7,052,901 B2 | 5/2006 | Crews |
| 7,059,414 B2 | 6/2006 | Rae et al. |
| 7,069,994 B2 | 7/2006 | Cooke, Jr. |
| 7,114,567 B2 | 10/2006 | Chan et al. |
| 7,159,659 B2 | 1/2007 | Welton et al. |
| 7,192,908 B2 | 3/2007 | Frenier et al. |
| 7,208,529 B2 | 4/2007 | Crews |
| 7,228,904 B2 | 6/2007 | Todd et al. |
| 7,261,160 B2 | 8/2007 | Welton et al. |
| 7,299,874 B2 | 11/2007 | Welton et al. |
| 7,303,012 B2 | 12/2007 | Chan et al. |
| 7,303,019 B2 | 12/2007 | Welton et al. |
| 7,306,041 B2 | 12/2007 | Milne et al. |
| 7,380,602 B2 | 6/2008 | Brady et al. |
| 7,427,584 B2 | 9/2008 | Frenier et al. |
| 7,589,050 B2 | 9/2009 | Frenier et al. |
| 7,655,603 B2 | 2/2010 | Crews |
| 7,687,439 B2 | 3/2010 | Jones et al. |
| 8,071,511 B2 | 12/2011 | Welton et al. |
| 8,312,929 B2 | 11/2012 | Frenier et al. |
| 8,936,111 B2 * | 1/2015 | Maghrabi et al. ............... 175/65 |
| 2002/0070022 A1 | 6/2002 | Chang et al. |
| 2002/0076803 A1 | 6/2002 | Crews |
| 2003/0054962 A1 | 3/2003 | England et al. |
| 2003/0104950 A1 | 6/2003 | Frenier et al. |
| 2003/0139298 A1 | 7/2003 | Fu et al. |
| 2003/0166472 A1 | 9/2003 | Pursley et al. |
| 2004/0009880 A1 | 1/2004 | Fu |
| 2004/0011527 A1 | 1/2004 | Jones et al. |
| 2004/0176478 A1 | 9/2004 | Dahayanake et al. |
| 2004/0177960 A1 | 9/2004 | Chan et al. |
| 2004/0235677 A1 | 11/2004 | Nguyen et al. |
| 2004/0254079 A1 | 12/2004 | Frenier et al. |
| 2005/0065036 A1 | 3/2005 | Treybig et al. |
| 2005/0124525 A1 | 6/2005 | Hartshorne et al. |
| 2005/0126781 A1 | 6/2005 | Reddy et al. |
| 2005/0209108 A1 | 9/2005 | Fu et al. |
| 2005/0233911 A1 | 10/2005 | Samuel |
| 2006/0013798 A1 | 1/2006 | Henry et al. |
| 2006/0014648 A1 | 1/2006 | Milson et al. |
| 2006/0025321 A1 | 2/2006 | Treybig et al. |
| 2006/0041028 A1 | 2/2006 | Crews |
| 2006/0054325 A1 | 3/2006 | Brown et al. |
| 2006/0131022 A1 | 6/2006 | Rae et al. |
| 2006/0180309 A1 | 8/2006 | Welton et al. |
| 2006/0180310 A1 | 8/2006 | Welton et al. |
| 2006/0183646 A1 | 8/2006 | Welton et al. |
| 2006/0258541 A1 | 11/2006 | Crews |
| 2007/0060482 A1 | 3/2007 | Welton et al. |
| 2007/0158067 A1 | 7/2007 | Xiao et al. |
| 2007/0213233 A1 | 9/2007 | Freeman et al. |
| 2007/0281868 A1 | 12/2007 | Pauls et al. |
| 2008/0035339 A1 | 2/2008 | Welton et al. |
| 2008/0035340 A1 | 2/2008 | Welton et al. |
| 2008/0039347 A1 | 2/2008 | Welton et al. |
| 2008/0190609 A1 | 8/2008 | Robb et al. |
| 2008/0194427 A1 | 8/2008 | Welton et al. |
| 2008/0194428 A1 | 8/2008 | Welton et al. |
| 2008/0194430 A1 | 8/2008 | Welton et al. |
| 2008/0200354 A1 | 8/2008 | Jones et al. |
| 2009/0042748 A1 | 2/2009 | Fuller |
| 2009/0042750 A1 | 2/2009 | Pauls et al. |
| 2009/0192054 A1 | 7/2009 | Frenier et al. |
| 2009/0192057 A1 | 7/2009 | Frenier et al. |
| 2009/0291863 A1 | 11/2009 | Welton et al. |
| 2010/0212896 A1 | 8/2010 | Navarro et al. |
| 2010/0261623 A1 | 10/2010 | Cassidy et al. |
| 2010/0276152 A1 | 11/2010 | De Wolf et al. |
| 2010/0311622 A1 | 12/2010 | Knox |
| 2011/0028358 A1 | 2/2011 | Welton et al. |
| 2011/0053811 A1 | 3/2011 | Horton et al. |
| 2011/0059873 A1 | 3/2011 | Weerasooriya et al. |
| 2011/0061870 A1 | 3/2011 | Navarro-Mascarell et al. |
| 2011/0214874 A1 | 9/2011 | Dakin et al. |
| 2011/0259592 A1 | 10/2011 | Reyes |
| 2011/0290482 A1 | 12/2011 | Weerasooriya et al. |
| 2012/0000652 A1 | 1/2012 | Jones et al. |
| 2012/0067576 A1 | 3/2012 | Reyes et al. |
| 2012/0097392 A1 | 4/2012 | Reyes et al. |
| 2012/0115759 A1 | 5/2012 | Reyes |
| 2012/0145401 A1 | 6/2012 | Reyes |
| 2012/0202720 A1 | 8/2012 | de Wolf et al. |
| 2012/0260938 A1 | 10/2012 | Zack et al. |
| 2013/0025870 A1 | 1/2013 | Berry et al. |
| 2013/0112106 A1 | 5/2013 | Malwitz et al. |

FOREIGN PATENT DOCUMENTS

| | | |
|---|---|---|
| WO | 2004/005671 A1 | 1/2004 |
| WO | 2004/090282 A1 | 10/2004 |
| WO | 2005/121273 A1 | 12/2005 |
| WO | 2006/054261 A2 | 5/2006 |
| WO | 2007/022307 A | 2/2007 |
| WO | 2007/022307 A2 | 2/2007 |
| WO | 2009002078 A2 | 12/2008 |
| WO | 2009/091652 A2 | 7/2009 |
| WO | 2009/137399 A2 | 11/2009 |
| WO | 2010/053904 A2 | 5/2010 |
| WO | 2012/000915 A1 | 1/2012 |
| WO | 2012/080296 A1 | 1/2012 |
| WO | 2012/080297 A1 | 6/2012 |
| WO | 2012/080298 A1 | 6/2012 |
| WO | 2012/080299 A1 | 6/2012 |
| WO | 2012/080463 A1 | 6/2012 |
| WO | 2012/113738 A1 | 8/2012 |
| WO | 2012/171858 A1 | 12/2012 |
| WO | 2013/015870 A1 | 1/2013 |
| WO | 2013115981 A1 | 8/2013 |
| WO | 2014150701 A1 | 9/2014 |

OTHER PUBLICATIONS

International Search Report and Written Opinion for PCT/US2013/021562 dated May 24, 2013.
"Scale," Sintef Petroleum Research, www.sintef.com, 2006.
AATCC Test Method 149-2002, Sep. 27, 2006.
Aker Well Services, 2007.
BASF, Performance Chemicals, not dated.
BASF, Technical Bulletin, Trilon M Types, May 2007.
Chem. Rev. 2007, Designing Small Molecules for Biodegradability; Boethling, R.S.; Sommer, E.; DiFiore, D., pp. 2207-2227.
Chemical Speciation of EDDS and its metal complexes in solution, 1999.
Chemical Stimulation in Near Wellbore Geothermal Formations, Jan. 2007.
Chemosphere vol. 34 No. 4, Biodegradation and Aquatic Toxicity of ADA, 1997.
Environ. Sci. Tech. 2002, Environmental Chemistry of Aminopolycarboxylate Chelating Agents; Bernd Nowack; 36(19), 4009-4016.
Environ Sct Technol, Extraction of Heavy Metals from Soils Using Biodegradable Chelating Agents, 2004.
Fighting Scale—Removal and Prevention, 1999.
Halliburton Top Technology Solutions 2006.
Integrated Risk Analysis for Scale Management in Deepwater Developments, 2005.
IPTC 14932, Challenges During Shallow and Deep Carbonate Reservoirs Stimulation, 2011.
Mahmoud Thesis, TAMU, 2011.
Rohit Mittal Thesis, TAMU.
Schlumberger Oilfield Glossary for Scale, 2007.

(56) References Cited

OTHER PUBLICATIONS

Simultaneous Gravel Packing and Filter-Cake Cleanup with Shunt Tubes, 2002.
Six Steps to Successful Sandstone Acidizing, 2008.
SPE 7565, The Development and Application of a High pH Acid Stimulation System for a Deep Mississippi Gas Well, 1978.
SPE 30419, Alternate acid blends for HPHT applications, 1995.
SPE 31076, Kinetics of Tertiary Reaction of HF on Alumino-Silicates, 1996.
SPE 36907, Improved Success in Acid Stimulations with a New Organic-HF System, 1996.
SPE 63242, Use of Highly Acid Soluble Chelating agents in Well Stimulation Services, 2000.
SPE 80597, a biodegradable chelating agent is developed for stimulation of oil and gas formations, 2003.
SPE 88597, Inhibitor Squeeze Design and Returns Monitoring to Manage Downhole Scale Problem, 2004.
SPE 121464, The optimum injection rate for wormhole propagation: myth or reality? 2009.
SPE 121709, LePage XP09160538, An Environmentally Friendly Stimulation Fluid for High-Temperature Applications, Mar. 2011.
SPE 121803, Wormhole formation in carbonates under varying temperature conditions, 2009.
SPE 127923, Evaluation of a New Environmentally Friendly Chelating Agent for High-Temperature Applications, 2011.
SPE 128091, Impact of Organic Acids/Chelating Agents on the Rheological Properties of an Amidoamine-Oxide Surfactant, 2011.
SPE 131626, An Effective Stimulation Fluid for Deep Carbonate Reservoirs: A Core Flood Study, Jun. 2010.
SPE 132286, Stimulation of Carbonate Reservoirs Using GLDA (Chelating Agent) Solutions, Jun. 2010.
SPE 133497, Optimum Injection Rate of a New Chelate That Can Be Used to Stimulate Carbonate Reservoirs, 2010.
SPE 139815, Sandstone Acidizing Using a New Class of Chelating Agents, 2011.
SPE 139816, Reaction of GLDA with Calcite: Reaction Kinetics and Transport Study, 2011.
SPE 140816, A Biodegradable Chelating Agent Designed to be an Environmentally Friendly Filter-cake Breaker, 2011.
SPE 141410, Scale formation prevention during ASP flooding, 2011.
SPE 143086, Effect of Reservoir Fluid Type on the Stimulation of Carbonate Reservoirs Using Chelating Agents, 2011.
SPE 143301, Novel Environmentally Friendly Fluids to Remove Carbonate Minerals from Deep Sandstone Formations, 2011.
SPE 147395, Removing Formation Damage and Stimulation of Deep Illitic-Sandstone Reservoirs Using Green Fluids, 2011.
SPE 149127, When Should We Use Chelating Agents in Carbonate Stimulation?, 2011.
SPE 152716, A New, Low Corrosive Fluid to Stimulate Deep Wells Completed With Cr-based Alloys, 2012.
SPE Production and Facilities, 2004, Hot oil and gas wells can be stimulated without acid.
SPE Production and Facilities, 2004, Organic Acids in Carbonate Acidizing.
International Search Report and Written Opinion for PCT/US2014/024026 dated Jun. 20, 2014.
Marco, Valerio B. Di et al., Complexation of 3, 4-hydroxypyridinecarboxylic Acids with Iron(III), Inorganica Chimica Acta. 2004, vol. 357, No. 12, pp. 3753-3758.
Marco, Valerio B. Di et al., Evaluation of 3, 4-hydroxypyridinecarboxylic Acids as Possible Bidentate Chelating Agents for Aluminum(III); synthesis and metal-ligand solution chemistry. European Journal of Inorganic Chemistry, 2002, vol. 202, Issue 10, pp. 2648-2655.
Dean et al., "Evaluation of 4-Hydroxy-6-Methyl-3-Pyridinecarboxylic Acid and 2,6-Dimethyl-4-Hydroxy-3-Pyridinecarboxylic Acid as Chelating Agents for Iron and Aluminum," Inorganica Chimica Acta 373 (2011), 179-186.
Chaves et al., "Alkylaryl-Amino Derivatives of 3-Hydroxy-4-Pyridinones as Aluminum Chelating Agents with Potential Clinical Application," Journal of Inorganic Biochemistry 97 (2003), 161-172.
Sija et al., "Interactions of Pyridinecarboxylic Acid Chelators with Brain Metail Ions: Cu(II), Zn(II), and Al(III)," Monatsh Chem (2011), 142:399-410.
Walther, John V., "Relation Between Rates of Aluminosilicate Mineral Dissolution, pH, Temperature, and Surface Charge," American Journal of Science, vol. 296, Summer, 1996, p. 693-728.
Clark et al., "Mixing and Aluminum Precipitation," Environ. Sci. Technol. 1993, 27, 2181-2189.
Duckworth et al., "Quantitative Structure—Activity Relationships for Aqueous Metal-Siderophore Complexes," Environ. Sci. Technol. 2009, 43, 343-349.
Fein et al., "Experimental Stud of Aluminum and Calcium Malonate Complexation at 25, 35, and 80° C.," Geochimica et Cosmochimica Acta, vol. 59, No. 6, pp. 1053-1062, 1995.
Moeller et al., "The Stabilities and Thermodynamic Functions for the Formation of Aluminium and Mercury (II) Chelates of Certain Polyaminepolyacetic Acids," J. Inorg. Nucl. Chem., 1966, vol. 28, pp. 153 to 159.
Kruck et al., "Synthesis of Feralex a Novel Aluminum/Iron Chelating Compound," Journal of Inorganic Biochemistry 88 (2002), 19-24.
Feng et al., "Aluminum Citrate: Isolationa nd Structural Characterization of a Stable Trinuclear Complex," Inorg. Chem. 1990, 29, 408-411.
Kalfayan, Leonard, "Production Enhancement with Acid Stimulation," PennWell Corporation, 2000.
Kalfayan, Leonard, "Production Enhancement with Acid Stimulation," 2nd ed., PennWell Corporation, 2008.
Frenier et al., "Use of Highly Acid-Soluble Chelating Agents in Well Stimulation Services," SPE 63242, 2000.
Nowack, Bernd, "Environmental Chemistry of Aminopolycarboxylate Chelating Agents," Institute of Terrestrial Ecology, American Chemical Society, 2002.
Advanced Corrosion and Scale Management in Oil and Gas, 2006.
AkzoNobel in the Oilfield Industry, 2008.
SPE 157467, Improved Health, Safety and Environmental Profile of a New Field Proven Stimulation Fluid, 2012.

* cited by examiner

TREATMENT FLUIDS COMPRISING A HYDROXYPYRIDINECARBOXYLIC ACID AND METHODS FOR USE THEREOF

CROSS-REFERENCE TO RELATED APPLICATIONS

The present application is a continuation-in-part of U.S. patent application Ser. No. 13/444,883, filed Apr. 12, 2012, which is incorporated herein by reference in its entirety.

BACKGROUND

The present disclosure generally relates to subterranean treatment fluids, and, more specifically, to treatment fluids that can mitigate the occurrence or effects of precipitation in a subterranean formation by complexing a metal ion therein during a treatment operation.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. Illustrative treatment operations can include, for example, drilling operations, fracturing operations, gravel packing operations, acidizing operations, scale dissolution and removal operations, sand control operations, consolidation operations, and the like.

Acidizing operations can stimulate a subterranean formation to increase production therefrom. During an acidizing operation, an acid-soluble material in the subterranean formation can be dissolved by one or more acids to expand existing flow pathways in the subterranean formation, to create new flow pathways in the subterranean formation, or to remove acid-soluble precipitation damage in the subterranean formation. The acid-soluble material being dissolved by the acid(s) can be part of the native formation matrix or can have been deliberately introduced into the subterranean formation in conjunction with a stimulation or like treatment operation (e.g., proppant particulates). Illustrative substances within the native formation matrix that may be dissolved by an acid include, but are not limited to, carbonates, silicates and aluminosilicates. Other substances can be dissolved as well during the course of performing an acidizing operation. As discussed below, certain components dissolved during an acidizing operation can be problematic and possibly detrimental for future production from the subterranean formation.

Carbonate formations can contain minerals that comprise a carbonate anion (e.g., calcite). When acidizing a carbonate formation, the acidity of the treatment fluid alone can be sufficient to solubilize the formation components. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. As used herein, the term "siliceous" refers to a substance having the characteristics of silica, including silicates and/or aluminosilicates. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). Acidizing a siliceous formation or a formation containing a siliceous material is thought to be considerably different than acidizing a carbonate formation. Specifically, the mineral and organic acids that can be effective for acidizing a carbonate formation may have little effect on a siliceous formation, since these acids do not effectively react with siliceous materials to affect their dissolution. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent, where the low pH state may promote initial silicon or aluminum dissolution and aid in maintaining these substances in a dissolved state.

Despite the advantages that can be realized by acidizing a siliceous formation, silicon and/or aluminum can produce damaging precipitation after their dissolution that can sometimes be more detrimental for production than if the acidizing operation had not been performed in the first place. Unless preventative measures are taken, some of which are discussed below, the equilibrium solubility levels of silicon and aluminum in a fluid usually depend upon one another. That is, by maintaining high levels of dissolved aluminum during an acidizing operation conducted with hydrofluoric acid, high levels of dissolved silicon can be maintained as well. In this regard, dissolved aluminum can be maintained in a fluid by coordination with fluoride ions, but such aluminum coordination can leave insufficient remaining fluoride ions for effective silicon solubilization to take place. Damaging silicon precipitation can occur as a result. Chelating agents can be used to increase the degree of silicon solubilization by maintaining aluminum in a dissolved state. Specifically, by chelating aluminum to form a soluble aluminum complex, increased levels of dissolved silicon may be realized, since more free fluoride ions are left available to affect its solubilization. In addition to chelating agents that target a metal ion, particularly aluminum, other types of complexing agents can be employed that directly complex silicon and promote its solubilization.

Iron dissolution can also be problematic during acidizing operations, particularly dissolution of ferrous iron. Ferric iron can form in the presence of dissolved oxygen and can later precipitate as ferric hydroxide above a pH of about 2. Ferric hydroxide precipitation represents an operational concern due to its highly gelatinous consistency. Ferric iron can also result from tubing pickling. The latter can usually be effectively managed by flowing out the fluid containing the iron dissolution products, although this added step may add to process complexity and cost. Due to the damage potential represented by ferric iron, its chelation may also be desirable while downhole.

Even when chelating agents are used, precipitation of insoluble fluorosilicates and aluminosilicates can sometimes be problematic in the presence of Group 1 metal ions (i.e., alkali metal ions). The terms "Group 1 metal ions" and "alkali metal ions" will be used synonymously herein. Under low pH conditions (e.g., below a pH of about 3), dissolved silicon can react with Group 1 metal ions (e.g., $Na^+$ and $K^+$) to produce insoluble alkali metal fluorosilicates and aluminosilicates. Other metal ions, including Group 2 metal ions (e.g., $Ca^{2+}$ and $Mg^{2+}$), may also be problematic in this regard. In many instances, costly pre-flush fluids may be introduced to a subterranean formation prior to performing an acidizing operation therein in order to decrease the quantity of available alkali metal ions. In some instances, such pre-flush fluids can contain ammonium ions ($NH_4^+$) that can displace alkali metal ions in the subterranean formation and leave it desirably conditioned for acidization. In contrast to alkali metal ions, ammonium ions are not believed to promote the formation of insoluble fluorosilicates and aluminosilicates. The use of pre-flush fluids, particularly those containing ammonium ions, can considerably add to the time and expense needed to perform an acidizing operation. In addition to problematic alkali metal ions in the subterranean formation, the precipitation of alkali metal fluorosilicates and fluoroaluminates can considerably limit the sourcing of carrier fluids that may be used when acidizing a subterranean formation.

SUMMARY

The present disclosure generally relates to subterranean treatment fluids, and, more specifically, to treatment fluids that can mitigate the occurrence or effects of precipitation in a subterranean formation by complexing a metal ion therein during a treatment operation.

In some embodiments, the present disclosure provides methods comprising: providing a treatment fluid comprising a hydroxypyridinecarboxylic acid, a salt thereof, a tautomer thereof, or a combination thereof; introducing the treatment fluid into a subterranean formation; and complexing a metal ion in the subterranean formation with the hydroxypyridinecarboxylic acid.

In other embodiments, the present disclosure provides methods comprising: providing a treatment fluid comprising a hydroxypyridinecarboxylic acid, a salt thereof, a tautomer thereof, or a combination thereof; and hydrofluoric acid or a hydrofluoric acid-generating compound; introducing the treatment fluid into a subterranean formation; dissolving a metal ion in the subterranean formation; and complexing the metal ion in the subterranean formation with the hydroxypyridinecarboxylic acid.

In some embodiments, the present disclosure provides treatment fluids comprising: a hydroxypyridinecarboxylic acid, a salt thereof, a tautomer thereof, or a combination thereof; and hydrofluoric acid or a hydrofluoric acid-generating compound.

The features and advantages of the present invention will be readily apparent to one having ordinary skill in the art upon a reading of the description of the preferred embodiments that follows.

DETAILED DESCRIPTION

The present disclosure generally relates to subterranean treatment fluids, and, more specifically, to treatment fluids that can mitigate the occurrence or effects of precipitation in a subterranean formation by complexing a metal ion therein during a treatment operation.

In commonly owned U.S. patent application Ser. No. 13/444,883 to the present inventors, filed on Apr. 12, 2012 and incorporated herein by reference in its entirety, the use of several substituted pyridine compounds for silicate complexation was disclosed. Among the substituted pyridine compounds that may be used for silicate complexation are various hydroxypyridinecarboxylic acids. Not only do hydroxypyridinecarboxylic acids have the ability to promote silicate complexation, but, as discussed hereinbelow, the inventors recognized that these compounds can also be effective for promoting complexation of aluminum ions and ferric ions. Thus, it is believed that hydroxypyridinecarboxylic acids may desirably promote the solubilization of silicon and aluminum in two different manners. As metal complexing agents, hydroxypyridinecarboxylic acids may present particular advantages, as discussed hereinafter.

As discussed above, the precipitation of dissolved silicon and aluminum in a subterranean formation may be mitigated through coordination of aluminum ions with a chelating agent. A number of different types of chelating agents may be used in this regard including, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, any salt thereof, any derivative thereof, and the like. Biodegradable chelating agents that may be particularly desirable for introduction into a subterranean formation are discussed in more detail hereinbelow.

For chelating agents having carboxylic acid groups, including those noted above, metal ion complexation is usually strongest when the carboxylic acid groups are at least partially in a deprotonated state. That is, in treatment fluids having pH values below the $pK_a$ of the carboxylic acid groups, chelation may be less effective, since the carboxylic acid groups remain substantially protonated. In order to promote effective metal ion chelation, the pH of the treatment fluid may need to be maintained at a level higher than that at which acidizing is typically most effective. For example, the carboxylic acid groups in many chelating agents are not substantially deprotonated below a pH of about 2 to 3. Thus, when vigorous acidization at a low pH is needed, metal ion chelation can sometimes not be a viable strategy for mitigating potential precipitation issues.

As an alternative to more conventional chelating agents in subterranean treatment operations and as alluded to above, the inventors determined that hydroxypyridinecarboxylic acids may present particular advantages. Foremost, many hydroxypyridinecarboxylic acids are particularly acidic and have exceptionally low $pK_a$ values as a result (e.g., $pK_a$ values below 1). Accordingly, their effective pH range for metal ion complexation is considerably lower than that of other types of chelating agents, thereby permitting more vigorous acidizing to take place. Moreover, hydroxypyridinecarboxylic acids can have exceptionally high formation constants for complexation of ferric iron and aluminum, thereby making these chelating agents well suited for use in addressing precipitation of these species during subterranean operations. A further advantage of hydroxypyridinecarboxylic acids in this regard is their high solubilities in aqueous fluids, thereby allowing treatment fluids with high capacities for metal ion complexation to be formulated.

In addition to the foregoing advantages, hydroxypyridinecarboxylic acids may make dissolved silicon and aluminum less susceptible to the presence of alkali metal ions. That is, by decreasing the amount of free aluminum and/or silicon in a fluid, an increased tolerance of the remaining silicon and aluminum toward alkali metal ions may result. Increasing the tolerance of dissolved silicon and aluminum toward the presence of alkali metal ions may allow fewer precautions to be taken during the treatment of a subterranean formation. For example, it may not be necessary to conduct a pre-flush treatment with an $NH_4^+$-containing treatment fluid prior to acidizing, or fewer pre-flush treatments may be needed. This can reduce the time and expense needed to conduct the acidizing operation. Likewise, there may be more tolerance for the introduction of alkali metal ions into a subterranean formation during acidization, thereby allowing saltier water sources to be used.

As a further advantage, hydroxypyridinecarboxylic acids can desirably be used in combination with other chelating agents to broaden the spectrum of metal ions that may be complexed during a treatment operation. Since hydroxypyridinecarboxylic acids complex ferric iron and aluminum ions so readily, they may be used in combination with other chelating agents that are less selective for the metal ions that they coordinate. Thus, hydroxypyridinecarboxylic acids may be used in combination with another chelating agent to target metal ions that are present in a subterranean formation in concert with large amounts of ferric iron and/or aluminum ions. Non-selective chelating agents may be unable to complex sufficient quantities of a desired metal ion in the presence of larger amounts of other ions (e.g., ferric iron and aluminum ions), whereas the same non-selective chelating agent may effectively complex the desired metal ion if a hydroxypyridinecarboxylic acid is used to complex ferric iron and/or aluminum ions. The selective complexation properties of hydroxypyridinecarboxylic acids can desirably allow lower quantities of both chelating agents to be used, thereby improving the environmental and cost profile of a treatment operation. As a non-limiting example, hydroxypyridinecarboxylic acids may be used in conjunction with a conventional chelating agent to control calcium ions in the presence of ferric iron and aluminum ions in a subterranean formation, where the conventional chelating agent can complex the calcium ions after the ferric iron and aluminum ions have been complexed with the hydroxypyridinecarboxylic acid.

As used herein, the term "hydroxypyridinecarboxylic acid" will refer to compounds containing a carboxylic acid group and a phenolic hydroxyl group bound to a pyridine ring. It is to be recognized that the term "hydroxypyridinecarboxylic acid" includes tautomeric forms of these compounds, including pyridones.

As used herein, the terms "complex," "complexing" and other variants thereof refer to the formation of a metal-ligand bond. In some embodiments, the metal-ligand bond may comprise a chelate bond.

Treatment fluids described herein can comprise a hydroxypyridinecarboxylic acid, a salt thereof, a tautomer thereof, or a combination thereof. In some embodiments, the treatment fluids can further comprise another chelating agent. In some embodiments, the treatment fluids can further comprise hydrofluoric acid or a hydrofluoric acid-generating compound. In further embodiments, the treatment fluids can further comprise an acid or an acid-generating compound.

In some embodiments, hydroxypyridinecarboxylic acids suitable for use in the treatment fluids described herein may contain their carboxylic acid group and their phenolic hydroxyl group in a 1,2-arrangement on the pyridine ring. Designation of such a relative arrangement of the carboxylic acid group and the phenolic hydroxyl group does not imply that these groups are located at the IUPAC nomenclature 1 and 2 positions of the pyridine ring, rather that the groups are located on adjacent carbon atoms. The 1,2-arrangement of the phenolic hydroxyl group and the carboxylic acid group may be especially effective for chelating metal ions, although the present invention is not to be limited in this regard by any particular theory or mechanism. In more particular embodiments, the hydroxypyridinecarboxylic acids may have a structure selected from the group consisting of the following:

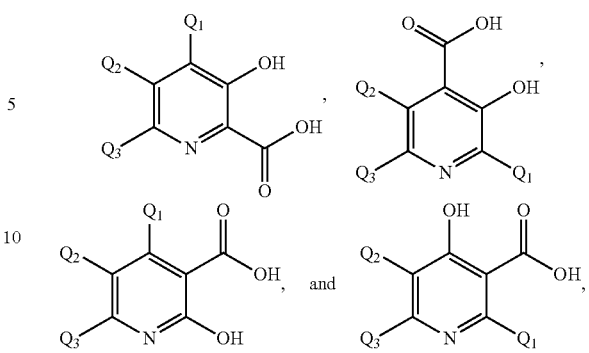

where $Q_1$-$Q_3$ are independently H or any substituent. The identities of $Q_1$-$Q_3$ are not believed to be particularly limited. Factors that may be taken into account when choosing a substitution pattern and $Q_1$-$Q_3$ substituent identities for the hydroxypyridinecarboxylic acids may include, for example, ease of synthesis, cost of starting materials, solubility, formation constants for ferric ion and/or aluminum ion complexation, carboxylic acid $pK_a$ values and the like. For example, one of ordinary skill in the art will recognize that electron-withdrawing substituents, such as nitro groups and halogens, may promote charge delocalization of a carboxylate anion and desirably lower $pK_a$ values of hydroxypyridinecarboxylic acids that are so-functionalized. In other embodiments, any of $Q_1$-$Q_3$ may comprise H or an alkyl group such as methyl, ethyl, propyl, isopropyl, butyl, isobutyl, or t-butyl groups, for example. In some embodiments, particularly desirable hydroxypyridinecarboxylic acids for aluminum and ferric ion complexation may include compounds such as, for example,

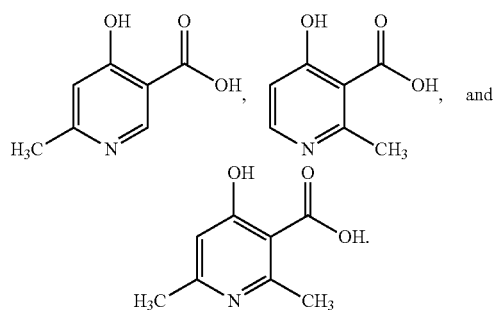

In still other embodiments, any two of $Q_1$-$Q_3$ that are located in a 1,2-arrangement may be connected together to form a carbocyclic ring, a heterocyclic ring, or a heteroaromatic ring. Illustrative ring systems that may be formed include, for example, tetrahydroquinolines, tetrahydroisoquinolines, quinolines, isoquinolines, pyrrolopyridines, pyridopyridines, imidazopyridines, and the like.

In some embodiments, the treatment fluids described herein may comprise an aqueous carrier fluid as their continuous phase. Suitable aqueous carrier fluids may include, for example, deionized water, fresh water, acidified water, salt water, seawater, brine (e.g., a saturated salt solution), or an aqueous salt solution (e.g., a non-saturated salt solution). Aqueous carrier fluids can be obtained from any suitable source. In some embodiments, the aqueous carrier fluid may be free of alkali metal ions or contain as low a concentration of alkali metal ions as attainable at a reasonable cost. Choice of a low salt or salt-free aqueous carrier fluid may lessen the incidence of alkali metal fluorosilicate or alkali metal aluminosilicate precipitation. In other embodiments, however, the treatment fluids described herein may comprise an aqueous carrier fluid having some alkali metal ions. In still other embodiments, the treatment fluids described herein may comprise an aqueous carrier fluid containing ammonium ions.

In some or other embodiments, the treatment fluids described herein may comprise an organic solvent, such as hydrocarbons, as at least a portion of its continuous phase.

The volume of the carrier fluid to be used in the present treatment fluids may be dictated by a number of factors including, for example, the solubility of the hydroxypyridinecarboxylic acid in the carrier fluid, the quantities of metal ions and siliceous materials in a subterranean formation being treated, and the like. Determination of an appropriate volume of carrier fluid may also be influenced by other factors, as will be understood by one having ordinary skill in the art.

The concentration of the hydroxypyridinecarboxylic acid used in the treatment fluids described herein can vary over a wide range. Factors that may dictate a chosen concentration of the hydroxypyridinecarboxylic acid may include, for example, the solubility of the hydroxypyridinecarboxylic acid in the carrier fluid, the quantities of metal ions and siliceous materials in the subterranean formation being treated, any combination thereof, or the like. In some embodiments, the concentration of the hydroxypyridinecarboxylic acid in the treatment fluid may range between about 0.1% to about 50% of the treatment fluid by weight, or between about 0.1% to about 5% of the treatment fluid by weight, or between about 1% to about 10% of the treatment fluid by weight, or between about 5% to about 15% of the treatment fluid by weight, or between about 0.5% to about 5% of the treatment fluid by weight, or between about 10% to about 25% of the treatment fluid by weight, or between about 5% to about 50% of the treatment fluid by weight.

In some embodiments, treatment fluids described herein can have a pH ranging between about 0 and about 7, or between about 0 and about 2, or between about 1 and about 2, or between about 1 and about 3, or between about 1 and about 4, or between about 1 and about 5, or between about 1 and about 6, or between about 1 and about 7. Such pH values, particularly those below a pH of about 2, may be especially advantageous for promoting dissolution of silicates and aluminosilicates at a desirable rate, as well as maintaining silicon in a dissolved state once dissolution occurs.

In some embodiments, the treatment fluids described herein may include an acid or an acid-generating compound. The acid or acid-generating compound may be a mineral acid or an organic acid. Suitable mineral acids may include, for example, hydrochloric acid, hydrofluoric acid and the like. Suitable organic acids may include, for example, formic acid, acetic acid, methanesulfonic acid, chloroacetic acid, dichloroacetic acid, trichloroacetic acid, and the like. In some embodiments, hydrofluoric acid may be present in the treatment fluids described herein in combination with an acid-generating compound or another acid, such as hydrochloric acid or an organic acid, for example. Use of hydrofluoric acid in combination with another acid or an acid-generating compound may help maintain the pH of the treatment fluid in a desired range as the hydrofluoric acid of the treatment fluid becomes spent. For example, the acid or acid-generating compound may be present in the treatment fluid in a quantity sufficient to maintain the pH of the treatment fluid within the ranges set forth above. In other embodiments, however, hydrofluoric acid may be the only acid present in the treatment fluid other than the hydroxypyridinecarboxylic acid chelating agent.

Examples of suitable acid-generating compounds may include, for example, esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

Examples of suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

When used, a hydrofluoric acid-generating compound can be present in the treatment fluids described herein in an amount ranging between about 0.1% to about 20% of the treatment fluid by weight. In other embodiments, an amount of the hydrofluoric acid-generating compound can range between about 0.5% to about 10% of the treatment fluid by weight or between about 0.5% to about 8% of the treatment fluid by weight. Hydrofluoric acid may be used in the treatment fluids in similar concentration ranges.

In some embodiments, the treatment fluids described herein can further comprise another chelating agent. Inclusion of another chelating agent in the present treatment fluids can desirably expand the breadth of metal ions that may be complexed beyond those that are readily chelated with hydroxypyridinecarboxylic acids (e.g., aluminum ions and ferric ions). The additional chelating agent that may be present is not believed to be particularly limited and may be chosen based on factors such as, for example, cost, environmental factors, and the presence of particular metal ions in a subterranean formation. In some embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, any salt thereof, any derivative thereof, or the like may be used.

In some or other embodiments, the additional chelating agent may be biodegradable, which may be particularly desirable for downhole use, where there may be regional environmental considerations to take into account. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. Suitable biodegradable chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediannine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

Like the hydroxypyridinecarboxylic acid chelating agent, the concentration of the additional chelating agent used in the treatment fluids described herein can vary over a wide range. Factors dictating a chosen concentration of the additional chelating agent may include, for example, the quantity and identity of metal ions in the subterranean formation being treated, the amount of hydroxypyridinecarboxylic acid that is present, the solubility of the additional chelating agent, or any combination thereof. In some embodiments, the concentration of the additional chelating agent in the treatment fluid may range between about 0.1% to about 50% of the treatment fluid by weight, or between about 0.1% and about 5% of the treatment fluid by weight, or between about 1% and about 10% of the treatment fluid by weight, or between about 5% and about 15% of the treatment fluid by weight, or between about 0.5% and about 5% of the treatment fluid by weight, or between about 10% and about 25% of the treatment fluid by weight, or between about 5% and about 50% of the treatment fluid by weight.

In some embodiments, the treatment fluids described herein may further comprise a silica scale control additive. As used herein, the term "silica scale control additive" will refer to any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Utilization of a silica scale control additive in combination with metal ion complexation provided by a hydroxypyridinecarboxylic acid may beneficially permit a greater level of dissolved silicon to be realized than is possible through metal ion complexation alone. Suitable silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services, Inc.). Other suitable silica scale control additives may include ortho-dihydroxybenzene compounds, such as tannic acid, for example, as described in commonly owned U.S. patent application Ser. No. 12/967,868, filed Dec. 14, 2010 and now available as United States Patent Application Publication 2012/0145401, which is incorporated herein by reference in its entirety.

In some embodiments, treatment fluids described herein may further comprise a silicate complexing agent, such as a functionalized pyridine compound, as described in commonly owned U.S. patent application Ser. No. 13/444,883, filed on Apr. 12, 2012 and incorporated herein by reference in its entirety.

In some embodiments, treatment fluids described herein may further comprise an alkali metal complexing agent, such as a crown ether, azacrown ether, or pseudocrown ether, as described in commonly owned U.S. patent application Ser. No. 13/444,897, filed on Apr. 12, 2012 and incorporated herein by reference in its entirety.

In some embodiments, treatment fluids described herein may further comprise a compound having two or more quaternized amine groups, as described in commonly owned U.S. patent application Ser. No. 13/588,158, filed on Aug. 17, 2012 and incorporated herein by reference in its entirety. In more particular embodiments, the compound having two or more quaternized amine groups may comprise a bis-quaternary ammonium compound. Illustrative bis-quaternary ammonium compounds that may be used in the treatment fluids described herein are further set forth in United States Patent Application Publications 2004/0235677, 2006/0013798, and 2010/0311622, each of which is incorporated herein by reference in its entirety. One example of a bis-quaternary ammonium compound composition that can be suitable for use in the treatment fluids described herein is product BQA-6170 (produced by Corsitech, Houston, Tex. and commercially available through Halliburton Energy Services, Inc.), which is a mixture of bis-quaternary ammonium compounds.

In further embodiments, the treatment fluids described herein may further comprise any number of additives that are commonly used in treatment fluids including, for example, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, and the like. Combinations of these additives can be used as well. Given the benefit of the present disclosure, one of ordinary skill in the art will be able to formulate a treatment fluid of the present disclosure such that the treatment fluid has properties suitable for a given application.

In various embodiments, the treatment fluids described herein may be used in conjunction with treating a subterranean formation. In some embodiments, the treatment fluids described herein may be used in conjunction with a stimulation operation conducted in a subterranean formation. In some embodiments, the stimulation operation can comprise a fracturing operation. In some or other embodiments, the stimulation operation can comprise an acidizing operation. In some embodiments, the treatment fluids described herein may be used in conjunction with a remediation operation in a subterranean formation. Each of the foregoing treatment operations is discussed in more detail hereinbelow.

The type of subterranean formation being treated with the present treatment fluids is not believed to be particularly limited. In some embodiments, the subterranean formation may comprise a carbonate formation, such as a limestone or dolomite formation, for example. Particularly in embodiments in which the treatment fluids comprise hydrofluoric acid or a hydrofluoric acid-generating compound, the subterranean formation may comprise a siliceous formation or have had a siliceous material introduced thereto. In some embodiments, the subterranean formation may comprise a sandstone formation or a clay-containing formation. In some or other embodiments, the subterranean formation may comprise native minerals such as, for example, authigenic or detrital minerals, particularly layered aluminosilicates, feldspathic minerals, or purely siliceous minerals. As generally discussed above, treatment of the subterranean formation may improve the formation's permeability by mitigating the formation of damaging precipitates and/or removing precipitates that have formed in the subterranean formation. In addition to subterranean formations that natively contain the above minerals, in some embodiments, the subterranean formation may have had any of the above minerals introduced thereto. For example, in some embodiments, proppant or gravel particulates that comprise a potentially problematic mineral can be introduced to a subterranean formation and subsequently be treated therein. That is, in some embodiments, the present treatment fluids may be used for treating a proppant pack or a gravel pack in a subterranean formation.

In more particular embodiments, the subterranean formation may comprise an aluminosilicate material, which can be natively present in the subterranean formation or have been introduced thereto. Aluminosilicate materials that may be present in a siliceous subterranean formation include clays (including mixed layer and swelling clays), zeolites, kaolinite, illite, chlorite, bentonite, and feldspars, for example. It is to be recognized that, in some embodiments, a siliceous subterranean formation may comprise other materials that are non-siliceous in nature. For example, in some embodiments, a siliceous subterranean formation may comprise about 1% to about 35% of a carbonate material. In some embodiments, the subterranean formation can comprise a matrix that is substantially non-siliceous in nature but contains a siliceous material therein (e.g., introduced proppant or gravel particulates or siliceous particulates within a carbonate formation matrix).

In some embodiments, the subterranean formation may comprise silicates, aluminosilicates, ferrous or ferric iron, or any combination thereof. These substances may be naturally occurring within the subterranean formation or be introduced during the course of treating the subterranean formation.

In some embodiments, methods described herein may comprise: providing a treatment fluid comprising a hydroxypyridinecarboxylic acid, a salt thereof, or a tautomer thereof; introducing the treatment fluid into a subterranean formation; and complexing a metal ion in the subterranean formation with the hydroxypyridinecarboxylic acid. In various embodiments, the metal ion may remain soluble in the treatment fluid after being complexed by the hydroxypyridinecarboxylic acid. In some embodiments, complexing the metal ion may comprise forming a chelate of the metal ion with the hydroxypyridinecarboxylic acid. In some embodiments, the metal ion being complexed with the hydroxypyridinecarboxylic acid may comprise an aluminum ion, a ferric ion, or any combination thereof. As will be understood by one having ordinary skill in the art, other metal ions may be complexed by a hydroxypyridinecarboxylic acid as well.

In some embodiments, the methods may further comprise introducing an acid or an acid-generating compound into the subterranean formation. In some embodiments, the acid or the acid-generating compound may comprise hydrofluoric acid or a hydrofluoric acid-generating compound. In some embodiments, the acid or the acid-generating compound may be introduced to the subterranean formation separately from the treatment fluid comprising the hydroxypyridinecarboxylic acid. In some or other embodiments, however, the acid or the acid-generating compound may be present in the treatment fluid comprising the hydroxypyridinecarboxylic acid.

In some embodiments, methods described herein may comprise: providing a treatment fluid comprising a hydroxypyridinecarboxylic acid, a salt thereof, or a tautomer thereof, and hydrofluoric acid or a hydrofluoric acid-generating compound; introducing the treatment fluid into a subterranean formation; dissolving a metal ion in the subterranean formation; and complexing the metal ion in the subterranean formation with the hydroxypyridinecarboxylic acid. In various embodiments, the metal ion may be dissolved with the hydrofluoric acid or the hydrofluoric acid-generating compound.

In some embodiments, the present treatment fluids may be used to remediate a subterranean formation that has precipitation or accumulation damage therein. As used herein, the term "precipitation or accumulation damage" refers to a siliceous material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from precipitation of dissolved silicon, an alkali metal fluorosilicate or an alkali metal fluoroaluminate, for example. In some embodiments, the treatment fluids described herein may be used to remediate precipitation or accumulation damage within a proppant pack or gravel pack within a subterranean formation.

In some embodiments, the treatment fluids described herein may be used in conjunction with acidizing a subterranean formation. As discussed above, acidizing a subterranean formation with the treatment fluids may desirably increase the formation's permeability.

In some embodiments, the treatment fluids described herein may be used in conjunction with fracturing a subterranean formation. In such embodiments, the treatment fluid may be introduced to the subterranean formation at a pressure sufficient to create or enhance at least one fracture therein. That is, the treatment fluid may be introduced to the subterranean formation at or above the fracture gradient of the subterranean formation. In some embodiments, the treatment fluids described herein may also be used to perform a combined stimulation operation such as, for example, a fracture-acidizing treatment.

In some or other embodiments, the treatment fluids described herein may be used to proactively mitigate the formation of precipitation or accumulation damage in a subterranean formation. In this regard, a treatment fluid comprising a hydroxypyridinecarboxylic acid may be introduced to a subterranean formation before a treatment fluid comprising hydrofluoric acid or hydrofluoric acid-generating compound, or a treatment fluid comprising a hydroxypyridinecarboxylic acid may be introduced to a subterranean formation after a treatment fluid comprising hydrofluoric acid or a hydrofluoric acid-generating compound. For example, in some embodiments, the hydroxypyridinecarboxylic acid may be introduced to the subterranean formation before an acidizing fluid containing hydrofluoric acid and/or another acid is introduced, such that the hydroxypyridinecarboxylic acid is already in place in the subterranean formation and ready to complex a metal ion dissolved by the acidizing fluid. In other embodiments, however, it may be more advantageous to begin initial metal ion dissolution by first introducing the acidizing fluid and thereafter introducing the hydroxypyridinecarboxylic acid. In still other embodiments, a treatment fluid comprising hydrofluoric acid, a hydrofluoric acid-generating compound, and/or another acid and a treatment fluid comprising a hydroxypyridinecarboxylic acid may be added to a subterranean formation concurrently (i.e., on-the-fly). In some embodiments, concurrent addition of the hydrofluoric acid and/or hydrofluoric acid-generating compound and the hydroxypyridinecarboxylic acid may comprise adding a treatment fluid that contains both hydrofluoric acid or a hydrofluoric acid-generating compound and a hydroxypyridinecarboxylic acid to the subterranean formation.

In some embodiments, the treatment fluids described herein may be used while drilling a wellbore penetrating a subterranean formation. For example, when used during drilling, the treatment fluids may desirably leave the subterranean formation conditioned with the hydroxypyridinecarboxylic acid in order to proactively manage the formation of damaging precipitates in the subterranean formation. It is to be recognized, however, that the present treatment fluids may also be used for proactive treatment of a subterranean formation at points in time other than in the drilling stage.

Embodiments disclosed herein include:

A. Methods of complexing a metal ion in a subterranean formation. The methods involve providing a treatment fluid comprising a hydroxypyridinecarboxylic acid, a salt thereof, a tautomer thereof, or a combination thereof; introducing the treatment fluid into a subterranean formation; and complexing a metal ion in the subterranean formation with the hydroxypyridinecarboxylic acid.

B. Methods of dissolving a metal ion in a subterranean formation. The methods involve providing a treatment fluid comprising a hydroxypyridinecarboxylic acid, a salt thereof, a tautomer thereof, or a combination thereof; and hydrofluoric acid or a hydrofluoric acid-generating compound; introducing the treatment fluid into a subterranean formation; dissolving a metal ion in the subterranean formation; and complexing the metal ion in the subterranean formation with the hydroxypyridinecarboxylic acid.

C. Treatment fluids comprising a hydroxypyridinecarboxylic hydroxypyridinecarboxylic acid, a salt thereof, a tautomer thereof, or a combination thereof; and hydrofluoric acid or a hydrofluoric acid-generating compound.

Each of embodiments A and B may have one or more of the following additional elements in any combination:

Element 1: wherein the metal ion is selected from the group consisting of an aluminum ion, a ferric ion, and any combination thereof.

Element 2: introducing an acid or an acid-generating compound into the subterranean formation.

Element 3: wherein the acid or the acid-generating compound comprises hydrofluoric acid or a hydrofluoric acid-generating compound.

Element 4: wherein the acid or the acid-generating compound is introduced into the subterranean formation separately from the treatment fluid.

Element 5: wherein the acid or the acid-generating compound is present in the treatment fluid.

Element 6: wherein the treatment fluid has a pH ranging between about 0 and about 7.

Element 7: wherein the treatment fluid has a pH ranging between about 0 and about 2.

Element 8: wherein the treatment fluid further comprises another chelating agent.

Element 9: wherein the hydroxypyridinecarboxylic acid contains a 1,2-arrangement of its carboxylic acid group and its hydroxyl group.

Element 10: wherein the hydroxypyridinecarboxylic acid has a structure selected from the group consisting of

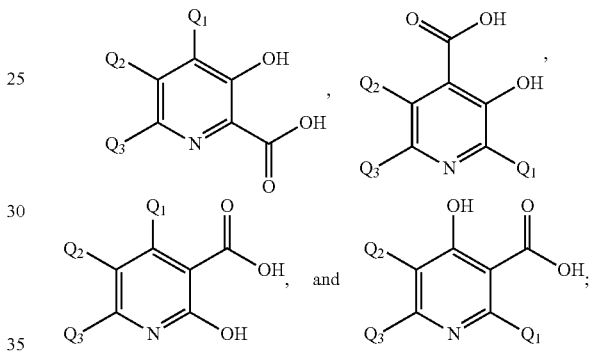

wherein $Q_1$-$Q_3$ are independently H or any substituent.

Element 11: wherein the treatment fluid further comprises a carrier fluid comprising an alkali metal ion.

By way of non-limiting example, exemplary combinations applicable to A and B include:

Combination 1: The method of A or B in combination with Elements 1 and 6.

Combination 2: The method of A or B in combination with Elements 1 and 7.

Combination 3: The method of A or B in combination with Elements 1 and 8.

Combination 4: The method of A or B in combination with Elements 1 and 10.

Combination 5: The method of A or B in combination with Elements 1 and 11.

Combination 6: The method of A or B in combination with Elements 1, 6 and 10.

Combination 7: The method of A or B in combination with Elements 1, 8 and 10.

Combination 8: The method of A or B in combination with Elements 1, 10 and 11.

Likewise, embodiment C may have any of Elements 6-11 present in any combination. By way of non-limiting example, exemplary combinations applicable to C include:

Combination 9: The treatment fluid of C in combination with Elements 7 and 8.

Combination 10: The treatment fluid of C in combination with Elements 7 and 10.

Combination 11: The treatment fluid of C in combination with Elements 6 and 11.

Combination 12: The treatment fluid of C in combination with Elements 7, 8 and 10.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid comprising a hydroxypyridinecarboxylic acid, a salt thereof, a tautomer thereof, or a combination thereof;
      wherein the hydroxypyridinecarboxylic acid has a 1,2-arrangement of a hydroxyl group and a carboxylic acid group on a pyridine ring;
   introducing the treatment fluid into a subterranean formation; and
   complexing a metal ion in the subterranean formation with the hydroxypyridinecarboxylic acid by forming a chelate.

2. The method of claim 1, wherein the metal ion is selected from the group consisting of an aluminum ion, a ferric ion, and any combination thereof.

3. The method of claim 1, wherein the hydroxypyridinecarboxylic acid has a structure selected from the group consisting of

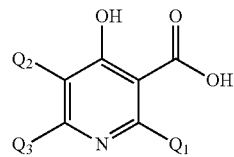

wherein Q1-Q3 are independently H or any substituent.

4. The method of claim 1, further comprising:
   introducing an acid into the subterranean formation.

5. The method of claim 4, wherein the acid comprises hydrofluoric acid.

6. The method of claim 4, wherein the acid is present in the treatment fluid.

7. The method of claim 6, wherein the treatment fluid has a pH ranging between about 0 and about 7.

8. The method of claim 6, wherein the treatment fluid has a pH ranging between about 0 and about 2.

9. The method of claim 6, wherein the treatment fluid further comprises a chelating agent.

10. A method comprising:
    providing a treatment fluid comprising:
       a hydroxypyridinecarboxylic acid, a salt thereof, a tautomer thereof, or a combination thereof;
          wherein the hydroxypyridinecarboxylic acid has a 1,2- arrangement of a hydroxyl group and a carboxylic acid group on a pyridine ring; and
       hydrofluoric acid;
    introducing the treatment fluid into a subterranean formation;
    dissolving a metal ion in the subterranean formation; and
    complexing the metal ion in the subterranean formation with the hydroxypyridinecarboxylic acid by forming a chelate.

11. The method of claim 10, wherein the metal ion is selected from the group consisting of an aluminum ion, a ferric ion, and any combination thereof.

12. The method of claim 10, wherein the metal ion is dissolved with the hydrofluoric acid.

13. The method of claim 10, wherein the treatment fluid has a pH ranging between about 0 and about 7.

14. The method of claim 10, wherein the treatment fluid has a pH ranging between about 0 and about 2.

15. The method of claim 10, wherein the treatment fluid further comprises a chelating agent.

16. The method of claim 10, wherein the hydroxypyridinecarboxylic acid has a structure selected from the group consisting of

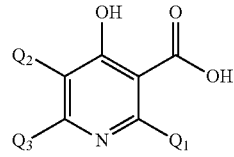

wherein Q1-Q3 are independently H or any substituent.

17. The method of claim 10, wherein the treatment fluid further comprises a carrier fluid comprising an alkali metal ion.

* * * * *